(12) United States Patent
Dollase et al.

(10) Patent No.: US 7,851,574 B2
(45) Date of Patent: Dec. 14, 2010

(54) FUNCTIONALIZED POLYMERS OR CONTACT ADHESIVE MASSES

(75) Inventors: Thilo Dollase, Hamburg (DE); Matthias Koop, Norderstedt (DE)

(73) Assignee: tesa SE, Hamburg (DE)

( * ) Notice: Subject to any disclaimer, the term of this patent is extended or adjusted under 35 U.S.C. 154(b) by 917 days.

(21) Appl. No.: 11/574,552

(22) PCT Filed: Sep. 9, 2005

(86) PCT No.: PCT/EP2005/054504

§ 371 (c)(1),
(2), (4) Date: Apr. 4, 2007

(87) PCT Pub. No.: WO2006/027385

PCT Pub. Date: Mar. 16, 2006

(65) Prior Publication Data

US 2007/0270559 A1    Nov. 22, 2007

(30) Foreign Application Priority Data

Sep. 9, 2004 (DE) .................. 10 2004 044 084
Sep. 9, 2004 (DE) .................. 10 2004 044 087

(51) Int. Cl.
C08F 126/06 (2006.01)

(52) U.S. Cl. ......................... 526/265; 526/299

(58) Field of Classification Search ............ 526/265, 526/299

See application file for complete search history.

(56) References Cited

U.S. PATENT DOCUMENTS

| | | | |
|---|---|---|---|
| 4,128,521 A | 12/1978 | Kroker et al. |
| 4,575,534 A | 3/1986 | Oshima et al. |
| 4,956,433 A | 9/1990 | Mezger |
| 5,082,922 A | 1/1992 | Brandenburger et al. |
| 5,391,631 A | 2/1995 | Porsch et al. |
| 5,767,210 A | 6/1998 | Lecomte et al. |
| 5,789,487 A | 8/1998 | Matyjaszewski et al. |
| 5,811,500 A | 9/1998 | Dubois et al. |
| 5,854,364 A | 12/1998 | Senninger et al. |
| 5,919,871 A | 7/1999 | Nicol et al. |
| 5,945,491 A | 8/1999 | Matyjaszewski et al. |
| 6,001,931 A | 12/1999 | Brahm et al. |
| 6,114,482 A | 9/2000 | Lecomte et al. |
| 6,258,504 B1 | 7/2001 | Bartus et al. |
| 6,281,311 B1 | 8/2001 | Lai et al. |
| 6,479,608 B1 | 11/2002 | Nesvadba et al. |
| 6,765,078 B2 | 7/2004 | Husemann et al. |
| 7,084,185 B2 | 8/2006 | Husemann et al. |
| 2006/0167181 A1 | 7/2006 | Husemann et al. |

FOREIGN PATENT DOCUMENTS

| | | |
|---|---|---|
| AU | 669297 B | 5/1996 |
| CA | 2322674 | 4/2001 |
| DE | 22 40 312 | 3/1973 |
| DE | 26 35 177 | 8/1976 |
| DE | 41 27 513 | 2/1993 |
| DE | 42 20 807 | 1/1994 |
| DE | 43 24 801 | 1/1995 |
| DE | 19738082 | 3/1999 |
| DE | 199 49 352 | 4/2000 |
| DE | 100 30 217 | 1/2002 |
| DE | 10029554 | 1/2002 |
| DE | 102 12 899 | 10/2003 |
| DE | 10259458 | 7/2004 |
| DE | 103 06 431 | 9/2004 |
| EP | 237 792 | 2/1987 |
| EP | 824 110 | 2/1998 |
| EP | 824 111 | 2/1998 |
| EP | 826 698 | 3/1998 |
| EP | 841 346 | 5/1998 |
| EP | 850 957 | 7/1998 |
| JP | 59187041 | 10/1984 |
| JP | 10226714 | 8/1998 |
| WO | WO 96/24620 | 8/1996 |
| WO | WO 98/01478 | 1/1998 |
| WO | WO 98/10004 | 3/1998 |
| WO | WO 98/13392 | 4/1998 |
| WO | WO 98/44008 | 10/1998 |
| WO | WO 99/03899 | 1/1999 |
| WO | WO 99/31144 | 6/1999 |
| WO | WO 00/14157 | 3/2000 |

*Primary Examiner*—Bernard Lipman
(74) *Attorney, Agent, or Firm*—Norris McLaughlin & Marcus PA

(57) ABSTRACT

Pressure-sensitive adhesives containing at least one functionalized polymer or block polymer having a weight average of the molar mass distribution of between 5,000 g/mol and 200,000 g/mol and a difference between $M_p$ and $M_{min}$ which is lower than 25,000 g/mol, where $M_p$ represents the peak molar mass of a monomodal polymer or the peak molar mass of the smallest mode in a bimodal or multimodal polymer and $M_{min}$ represents the lowest molar mass in the molar mass distribution, defined at each point where the cumulative frequency of the molar mass distribution has a value of 0.05, the functionalized polymer or block polymer carries at least one type of functionalization that can be used for a subsequent cross-linking and the at least one type of functionalization of the functionalized polymer results from the use of at least one type of functionalized monomer during the production of the functionalized polymer.

29 Claims, 2 Drawing Sheets

FUNCTIONALIZED POLYMERS OR CONTACT ADHESIVE MASSES

Figure 1:
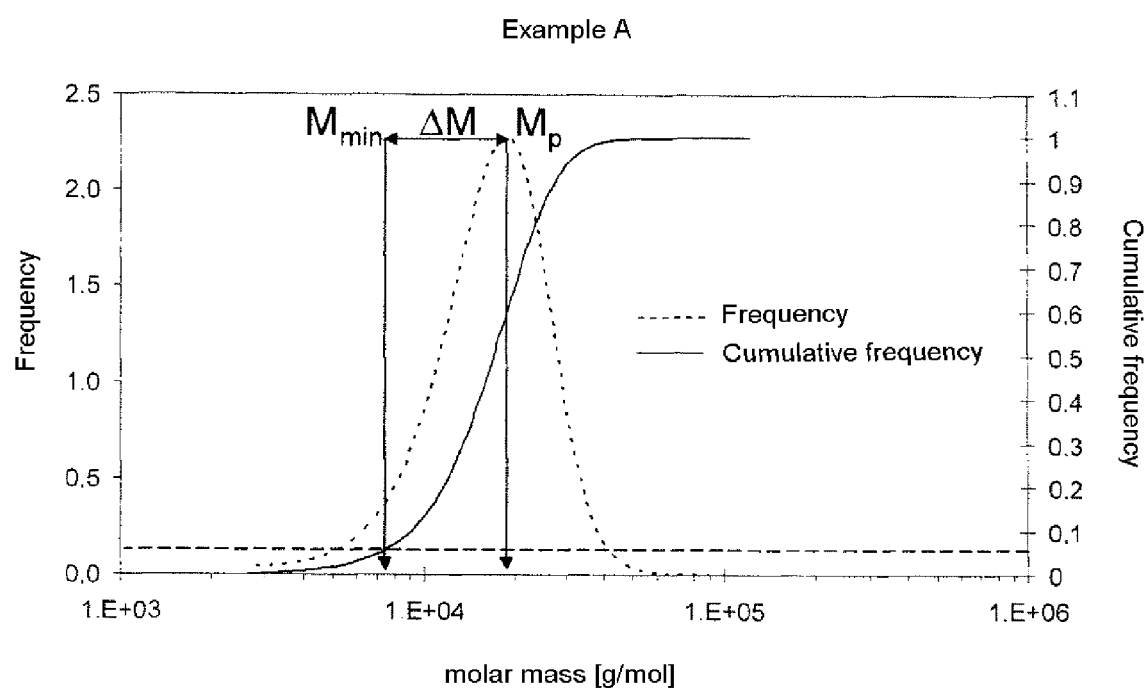

This is a 371 of PCT/EP2005/054504 filed 9 Sep. 2005 (international filing date).

The invention relates to a functionalized polymer or to a pressure-sensitive adhesive which comprises at least one functionalized polymer or block polymer and to their use in self-adhesive tapes. The functionalized polymer or block polymer has a specific form of molar mass distribution.

BACKGROUND OF THE INVENTION

Diverse applications require low-viscosity fluids which can easily be applied to any desired surfaces and subsequently can be converted, through a build-up in molecular weight, to layers having a variety of properties according to application. Important applications of such systems include, in particular, coatings and adhesives. One particular form of adhesives are pressure-sensitive adhesives, which are distinguished by permanent tack.

Starting compounds used for organic surface layers are frequently low molecular mass or oligomeric systems which have been provided with at least two reactive groups, via which a build-up in molecular weight is realised in the operation of curing. Typical representatives are thermally curable epoxy resins and radiation-curable acrylic resins. The reactive groups in this case are oxiranes or unsaturated acrylate or methacrylate groups. Since, naturally, the distance between two adjacent reactive groups in the low molecular mass or oligomeric starting compounds is low, the operation of curing generally produces thermosets, in other words networks with a very high nodal density. For some applications, however, it is desirable for the mechanical properties of the surface layer under preparation to correspond not to those of thermosets but instead to those of elastomers, in other words networks with a relatively low nodal density. Such applications also include the field of pressure-sensitive adhesives. In order to achieve the build-up of networks that can be used as pressure-sensitive adhesives, it is necessary to choose starting compounds in which the reactive groups have a relatively large distance from one another, but still have a sufficiently low viscosity for good processing properties. Preferential suitability for this purpose is possessed by functionalized polymers with a low degree of polymerization.

The simplest approach, from a conceptual standpoint, for corresponding starting compounds is represented by telechelic polymers. This term refers to linear polymers which carry a functional group at both chain ends. If the chemistry of the functional groups has been chosen such that they are able to react with a crosslinker, then the free network arc length in the resulting network is defined by the degree of polymerization of the telechelic starting polymer. The literature has described a range of different kinds of telechelic polymers and their applications [O. Nuyken, S. Pask in "Encyclopedia of Polymer Science and Engineering, H. F. Mark, N. M. Bikales, C. G. Overberger, G. M. Menges (eds.), 2nd ed., 1985, Wiley, New York, Vol. 16, p. 494ff]. One important application of telechelic polymers is represented by the field of polyurethanes [G. W. Becker, D. Braun (eds.), Kunststoff Handbuch, Vol. 7, Polyurethane, 3rd ed., 1993, C. Hanser, Munich]. Here, hydroxyl-functionalized oligomers, for example, are reacted with diisocyanates, so that thermoplastic elastomers are obtained by chain extension. Within the field of the polyurethanes a restriction is generally made to those starting polymers which are obtained via a polycondensation reaction (such as polyethers and polyesters, for example) or via anionic addition polymerization (such as polydienes and hydrogenated polydienes, for example), since in those cases, for technical reasons associated with the polymerization, end functionalization is possible in an advantageous way. Polymers prepared by free-radical addition polymerization, in contrast, allow no such simple functionalization of both chain ends. If polymers of this kind are wanted as starting polymers, use may be made of controlled-growth free-radical polymerization methods where the functionalization is already present in the control reagent (see, for example, EP 237 792 of Akzo). There is, however, an expectation of high costs for such functionalized regulator molecules, and, owing to the low degree of polymerization, these costs impact directly on the costs of the functionalized polymer.

Another easy way of preparing functionalized polymers which can be realised in particular for free-radically polymerizable systems is the use of functional comonomers when building up the polymers. Although the degree of functionalization in these materials is not as well defined as in telechelic systems, such definition is also not needed in every case. It is important that the starting polymers have good coating properties, which are manifested in the melt viscosity at processing temperature. Since the melt viscosity depends significantly on the degree of polymerization, it is preferred to use starting polymers of low molar mass, and to some extent oligomers. In order to generate advantageous crosslinking behaviour and good product properties, care must be taken to ensure that the short-chain starting polymers are as far as possible fully functionalized. A maximal degree of functionalization, however, is desired, because (a) apart from the possibility of subsequent crosslinking there should be no change in any further polymer properties, particularly the dynamomechanical or rheological properties, which derive in particular from the comonomers used as majority component, and (b) complete reaction of the functional groups during a subsequent crosslinking reaction is possible, so that any latent readiness to react in the end product, such as a postcrosslinking potential, for example, of these reactive groups is ruled out, without the distance between adjacent nodes becoming too close.

A copolymer prepared by conventional free-radical addition polymerization is distinguished not only, like all synthetic polymers, by a distribution of molecular masses but also, even for the rare case of all monomers used having the same copolymerization parameters, by a distribution in composition. This means that the exact composition of the copolymers varies from chain to chain, for statistical reasons. If a copolymer is to be prepared from a monomer mixture in which one variety of monomer, a functionalized type, for example, is present only to a small extent, then individual polymer chains may be formed in which no monomers of this functionalized type are incorporated. The lower the average molar mass of the copolymer, the higher the probability that individual chains have not received any functionalization. In any subsequent crosslinking step, such chains cannot be integrated into the network that forms. If the copolymer is a material with a low softening temperature, as is the case for pressure-sensitive adhesives, then these unfunctionalized polymer chains remain in the network as migratable components. They then act as plasticizers and are potentially capable of accumulating on surfaces.

A further problem associated with copolymerization arises through a difference that may possibly occur in the copolymerization parameters of the comonomers used, these parameters depending, inter alia, on the chemical nature of the comonomers [J. Brandrup, E. H. Immergut, E. A. Grulke (eds.), Polymer Handbook, 4th ed., 1999, Wiley, New York].

Since functionalized monomers differ in this respect above all from unfunctionalized monomers, it is frequently necessary to take account of this aspect when building up functionalized copolymers. A binary monomer mixture may be cited by way of example. If the functionalized comonomer has a copolymerization parameter of significantly more than 1, and the unfunctionalized comonomer has a copolymerization parameter significantly less than 1, which is the case with the combination of 2-hydroxyethyl methacrylate as functionalized comonomer and n-butyl acrylate as unfunctionalized comonomer, then 2-hydroxyethyl methacrylate will be incorporated preferentially into the polymer chain and consumed preferentially. In chains which are not formed until towards the end of the polymerization, it is then not possible for any 2-hydroxyethyl methacrylate to be incorporated, and so these chains remain unfunctionalized. As an attempt to prepare copolymers with a narrow distribution of composition, the literature describes metering techniques [see, for example, I. N. Askill, D. K. Gilding, *Polymer*, 1981, 22, 342]. This technique, known as the semibatch process, must be optimized for every comonomer mixture, however, and necessitates a reactor fitted with a metering system [A. Echte, Handbuch der technischen Polymerchemie, 1993, Wiley-VCH, Weinheim].

An important basis for materials which are employed in surface layers, whether as coatings or as pressure-sensitive adhesives, are (meth)acrylate copolymers. The reason for this is that the properties of this kind of copolymers can be adjusted through the choice of the comonomers used, for which a broad range of different kinds of acrylate and methacrylate comonomers are available as starting materials. Depending on the choice and proportion of the comonomers used it is possible, for example, to control the mechanical properties or the polarity of the resulting copolymers. (Meth) acrylate copolymers are notable, furthermore, for high stability with respect to temperature, UV radiation and oxidation, so making them especially suitable for applications requiring weathering stability. A particularly appropriate functionalization possibility for (meth)acrylate copolymers is that of statistical functionalization through the use of functionalized comonomers, since they can be prepared by a free-radical polymerization process. By (meth)acrylate copolymers are meant, for the purposes of this invention, copolymers synthesized primarily from acrylate monomers and/or methacrylate monomers.

Processes for preparing short-chain (meth)acrylate copolymers as starting polymers for surface layers, known as acrylic resins or acrylate resins, are known from the literature. DE 26 35 177 of BASF AG describes acrylate resins which are polymerized from a comonomer mixture containing 10%-35% by weight of α,β-olefinically unsaturated carboxylic acids, in order to introduce functional groups, and which are polymerized without the presence of regulators at more than 160° C. The polydispersity of these acrylate resins is said to be 2.5. U.S. Pat. No. 5,082,922 of Valspar Corp. describes the derivatization of acrylic resins obtained by free-radical polymerization from a comonomer mixture containing at least 5% of an ethylenically unsaturated comonomer containing hydroxyl or carboxylic acid groups as functional groups. DE 22 40 312 of Ford Werke AG describes crosslinkable methacrylate resins which are obtained by free-radical polymerization and recovered by the use of 8% to 30% of glycidyl methacrylate as a functionalized comonomer.

For conventional free-radical polymerization the achievable polydispersity, given by the ratio of weight average to number average of the molecular weight distribution of the polymer produced, is ideally 1.5 for termination exclusively by disproportionation and ideally 2.0 for termination exclusively by combination. As a result of chain transfer events, however, the distribution of polymers obtained by conventional free-radical polymerization tends to be relatively broad. This distribution of molar masses results in a distribution not only in the area of the high molecular mass fraction but also in the area of the low molecular mass fraction. The formation of a high fraction of low molecular mass components during the polymerization may prove, in accordance with what has been said above, and solely on statistical grounds, to be deleterious for the incorporation of those monomers present in a low proportion in the monomer mixture.

JP 10226714 A describes copolymers which contain (meth)acrylates and have a narrow monomodal molar mass distribution. The copolymers disclosed are prepared by means of anionic polymerization. For this reason it is necessary to convert reactive and in particular acid-containing comonomers into less reactive groups prior to the polymerization. Where the comonomer mixture includes an acid-containing component, successful anionic polymerization is not possible. Acid-containing copolymers are obtained by using silyl-protected comonomers, which when the polymerization is over have to be deprotected, in an additional step. The copolymers proposed are intended as resistant material for ArF excimer lasers.

DE 43 24 801 discloses (meth)acrylate copolymers which contain OH groups and have weight-average molar masses of below 8600 g/mol. The copolymers described are prepared by free-radical polymerization and are said to have a narrow monomodal distribution. The (meth)acrylate copolymers are intended for coatings applications.

DE 103 06 431 likewise describes (meth)acrylate copolymers with a monomodal distribution. The (meth)acrylate copolymers are prepared by means of free-radical polymerization and are obtained as particles dispersed in an emulsion. The particles are intended for coatings applications.

None of these patent specifications describes polymers which at low molar masses have a small difference, relative thereto, between the peak molar mass and the smallest molar mass determined at a given point. Furthermore, none of these patent specifications describes polymers with a narrow molar mass distribution which are to be used as adhesives and are therefore subjected to crosslinking.

Adhesive compositions based on poly(meth)acrylates are known from publications including DE 100 30 217 and DE 102 12 899. The polymers are crosslinked for example by means of actinic radiation. The pressure-sensitive adhesives described in DE 100 30 217 have a weight-average molar mass of at least 250 000 g/mol. None of these pressure-sensitive adhesives comprises polymers which have, at low molar masses, a small difference, relative thereto, between the peak molar mass and the smallest molar mass determined at a given point.

DE 42 20 807 discloses a film-forming binder based on vinyl polymers having a narrow molecular weight and a broad molecular weight distribution. DE 41 27 513 discloses polyacrylate resins suitable as binders. The polyacrylate resin may be a hydroxy-functionalized polyacrylate having a bimodal distribution. No polymers are described that suggest any indication of the advantageous molar mass distributions of the invention.

It is an object of the invention to eliminate the disadvantages of the prior art. The intention in particular is to specify a functionalized polymer or a pressure-sensitive adhesive which can be produced on the basis of functionalized copolymers with a low molecular weight and a reduced fraction of non-functionalized chains, via a free-radical polymerization process, preferably in batchwise operation.

SUMMARY OF THE INVENTION

In accordance with the invention a pressure-sensitive adhesive is provided which comprises at least one functionalized polymer, where in the functionalized polymer the weight average of the molar mass distribution is situated between 5000 g/mol and 200 000 g/mol, preferably between 10 000 g/mol and 100 000 g/mol, and the difference between $M_p$ and $M_{min}$ is less than 25 000 g/mol, preferably less than 15 000 g/mol, where (a) $M_p$ is the peak molar mass of a monomodal polymer or the peak molar mass of the smallest mode in a bimodal or multimodal polymer,
(b) $M_{min}$ is the smallest molar mass occurring in the molar mass distribution, defined on the basis of the point at which the cumulative frequency of the molar mass distribution has a value of 0.05,
(c) the functionalized polymer is linear, branched or star-shaped in structure,
(d) the functionalized polymer carries at least one kind of functionalization, which can be utilized for subsequent crosslinking of the functionalized polymer,
(e) at least 50% of the polymer chains of the functionalized polymer carry at least two functionalizations,
(f) at least 75% of the polymer chains of the functionalized polymer carry at least one functionalization; and
(g) the at least one kind of functionalization of the functionalized polymer results from the use of at least one variety of a functionalized monomer in the preparation of the functionalized polymer.

Further provided in accordance with the invention is a pressure-sensitive adhesive comprising at least one functionalized block copolymer wherein the weight average of the molar mass distribution is situated between 5000 g/mol and 200 000 g/mol, preferably between 10 000 g/mol and 100 000 g/mol, and the difference between $M_p$ and $M_{min}$ is less than 25 000 g/mol, preferably less than 15 000 g/mol, where (a) $M_p$ is the peak molar mass of a monomodal block copolymer or the peak molar mass of the smallest mode in a bimodal or multimodal block copolymer,
(b) $M_{min}$ is the smallest molar mass occurring in the molar mass distribution, defined on the basis of the point at which the cumulative frequency of the molar mass distribution has a value of 0.05,
(c) the functionalized block copolymer is linear, branched, star-shaped or grafted in structure,
(d) at least one block of the functionalized block copolymer carries at least one kind of functionalization, which can be utilized for subsequent crosslinking of the functionalized block copolymer,
(e) at least 50% of at least one block of the block copolymer chains of the functionalized block copolymer carry at least two functionalizations,
(f) at least 75% of at least one block of the block copolymer chains of the functionalized block copolymer carry at least one functionalization,
(g) its at least one kind of functionalization of the functionalized block copolymer results from the use of at least one variety of a functionalized monomer in the preparation of the functionalized block copolymer.

The functionalized polymers and block copolymers can be prepared, for example, by a controlled-growth free-radical polymerization process.

The functionalized polymers or block polymers are, in one embodiment, functionalized (meth)acrylate copolymers having a low molar mass and containing, by virtue of the preparation process, a reduced fraction of non-functionalized chains. The functionalized (meth)acrylate copolymers of the invention are distinguished by a particularly advantageous form of molar mass distribution on the flank of low molar masses. They are obtainable, for example, by means of a controlled-growth, quasi-living or living, free-radical polymerization process.

DETAILED DESCRIPTION

The invention will be described in greater detail below with reference to the drawings. In the drawings

BRIEF DISCUSSION OF THE DRAWINGS

Figure 2:
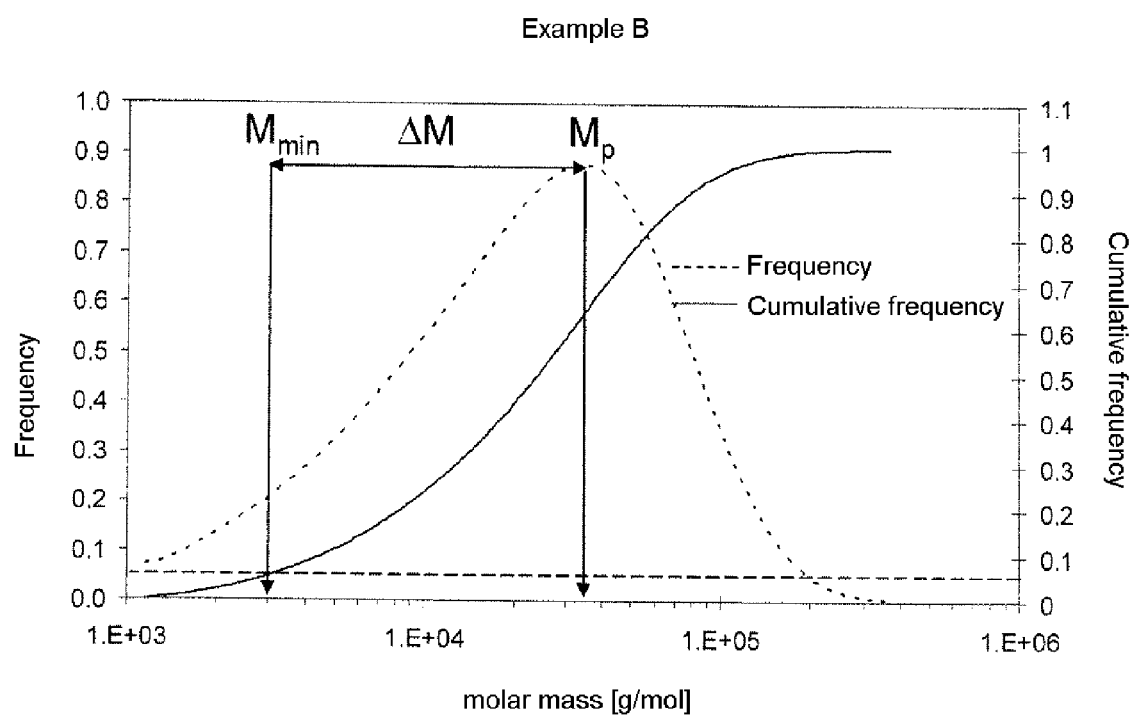

FIG. 1 shows the molar mass distribution of a functionalized polymer according to example A, which is suitable for the adhesive composition of the invention; and FIG. 2 shows the molar mass distribution of a comparative example.

COMPOSITION AND STRUCTURE OF THE FUNCTIONALIZED POLYMERS OF THE INVENTION

Surprisingly it has been found that functionalized polymers improved over the prior art are distinguished by a specific form of their molar mass distribution. Polymers which can be used in accordance with the invention differ from other polymers in respect of their molar mass distribution in particular in the area below the peak molar mass $M_p$, in other words in the low molecular mass area. The polydispersity, however, which is typically employed in order to describe molar mass distributions, reflects primarily the area above the peak molar mass, owing to the heavy weighting of the higher molecular mass fractions resulting from the use of the weight average. It is therefore necessary to find a different criterion that describes primarily the low molecular mass fraction of the molar mass distribution. A practical variable which is utilized for this purpose below proves to be the molar mass difference $\Delta M$, which describes the breadth of the molar mass distribution of the low molecular mass fraction. It is defined as the difference between the peak molar mass and the smallest molar mass occurring in the molar mass distribution, $M_{min}$. $M_{min}$ is determined from the low molecular mass fraction of the molar mass distribution at the point at which the cumulative frequency of the molar mass distribution has a value of 0.05 (where the molar mass distribution is a continuous function, then instead of the cumulative frequency the integral frequency is employed for determining $M_{min}$, likewise at the point 0.05. Similarly, in this case, the cumulative frequency is replaced by the integral frequency at all other places in this invention). This value has been chosen arbitrarily, but proves to be favorable for evaluation reasons. The most important definitions and meanings of the variables used here which relate to the molar mass distribution are summarized in Table 1 (to supplement this, see also FIG. 1 and FIG. 2).

The functionalized polymers of the invention are distinguished by the fact that they comprise a reduced low molecular mass fraction, specifically to an extent such that the parameter $\Delta M$ has a value below 25 000 g/mol, preferably below 15 000 g/mol. The weight average of the molar mass distribution of the polymers functionalized in accordance with the invention is situated between 5000 g/mol and 200 000 g/mol, preferably between 10 000 g/mol and 100 000 g/mol.

TABLE 1

| Variable/term | Meaning/definition for the purposes of this invention |
| --- | --- |
| $M_n$ | number average of the molar mass distribution |
| $M_w$ | weight average of the molar mass distribution |
| $M_{min}$ | molar mass for which the cumulative frequency representation of the molar mass distribution has a value of 0.05 |
| $M_p$ | molar mass at which the molar mass distribution exhibits a maximum |
| D | = $M_w/M_n$ (polydispersity) |
| ΔM | = $M_p - M_{min}$ (fraction of low molar mass constituents in the molar mass distribution; indicator of the steepness of the molar mass distribution curve for small molar masses) |
| Frequency | amount of a polymer fraction having a defined molar mass |
| Cumulative frequency | cumulative function of the discrete frequency representation of the molar mass distribution, standardized to a value of 1 |
| Low molecular mass fraction | = (cumulative frequency at the point $M_p$) − (cumulative frequency at the point $M_{min}$) |
| High molecular mass fraction | = 1 − (cumulative frequency at the point $M_p$) |
| Monomodal | attribute of a polymer whose elugram is described by a single molar mass distribution |
| Bimodal | attribute of a polymer whose elugram is described by a superposition of two molar mass distributions |
| Multimodal | attribute of a polymer whose elugram is described by a superposition of a multiplicity of molar mass distributions |

The functionalized polymers of the invention can have a monomodal, a bimodal or a multimodal molar mass distribution. The above remarks on the nature of the low molecular mass fraction of the functionalized polymers of the invention apply equally to bimodal and multimodal systems as to monomodal systems. The variable $M_{min}$ is determined in a similar way for monomodal, bimodal and multimodal systems. The critical parameter in the sense of this invention for determining ΔM is the peak molar mass of the smallest mode occurring in a bimodal or multimodal system. If the superposition of different modes leads to a pronounced broadening of ΔM, namely to values above 25 000 g/mol, then such systems are not in accordance with the invention and can also not be used advantageously for the purposes of this invention.

The functionalized polymers of the invention are prepared from at least one variety of unfunctionalized monomers and at least one variety of functionalized monomers. The fraction of the functionalized monomers in the monomer mixture which is polymerized in order to prepare the functionalized polymers of the invention is up to 20%, preferably up to 10%, more preferably up to 5%. At least 75% of the polymer chains contain at least one functionalization, and at least 50% of polymer chains contain at least two functionalizations. The nature of the functionalization may be the same or different. The functionalized polymers of the invention are prepared from at least 50%, preferably at least 75%, of α,β-unsaturated carbonyl compounds.

In one preferred version of this invention the functionalized polymers of the invention have a softening temperature, as given by the glass transition temperature in amorphous systems and by the crystallite melting temperature in semicrystalline systems, of below +25° C. and have a melt viscosity, given as the zero viscosity at +60° C., of less than 10 kPa s, preferably less than 1 kPa s, more preferably less than 0.1 kPa s.

The functionalized polymers of the invention may be linear, star-shaped or branched in structure. Likewise in accordance with the invention are linear or star-shaped block copolymers or graft copolymers which comprise at least one polymer block or, respectively, at least one graft polymer for which the indications given above in respect of the nature and composition of the underlying functionalized and unfunctionalized monomers applies, and for which the entire block copolymer or graft copolymer complies with the indications given above in respect of the molar mass distribution, particularly with respect to ΔM and the weight average, and of the melt viscosity.

Examples that may be mentioned of unfunctionalized monomers which can be used in accordance with the invention for synthesizing the functionalized polymers of the invention include—without wishing to make any restriction—unfunctionalized α,β-unsaturated esters of the general structure (I)

where $R^1$=H or $CH_3$ and $R^2$=linear, branched or cyclic, saturated or unsaturated alkyl radicals having 1 to 30 carbon atoms, in particular having 4 to 18 carbon atoms.

Unfunctionalized monomers which can be used with great preference in the sense of the general structure (I) for the functionalized polymers of the invention embrace acrylic and methacrylic esters with alkyl groups consisting of 1 to 30 carbon atoms, in particular 4 to 18 carbon atoms. Specific examples of such compounds, without wishing to be restricted by this enumeration, include methyl acrylate, ethyl acrylate, n-propyl acrylate, n-butyl acrylate, n-pentyl acrylate, n-hexyl acrylate, n-heptyl acrylate, n-octyl acrylate, n-nonyl acrylate, lauryl acrylate, stearyl acrylate, their branched isomers, such as 2-ethylhexyl acrylate and isooctyl acrylate, and also cyclic monomers, such as cyclohexyl acrylate or norbornyl acrylate and isobornyl acrylate, and also their methacrylate analogues.

Likewise possible for use as unfunctionalized monomers for the functionalized polymers of the invention are acrylic and methacrylic esters which contain aromatic radicals, such as phenyl acrylate, benzyl acrylate, benzoin acrylate, phenyl methacrylate, benzyl methacrylate or benzoin methacrylate.

In addition it is possible as an option to use vinyl monomers from the following groups: vinyl esters, vinyl ethers, vinyl halides, vinylidene halides, and vinyl compounds containing aromatic rings and heterocycles in α position. For the vinyl monomers which can be used optionally, mention may be made, by way of example, of selected monomers which can be used in accordance with the invention: vinyl acetate, vinylformamide, vinylpyridine, ethyl vinyl ether, 2-ethylhexyl vinyl ether, butyl vinyl ether, vinyl chloride, vinylidene chloride, acrylonitrile, styrene and α-methylstyrene.

Examples of functionalized monomers which can be used in accordance with the invention for synthesizing the functionalized polymers of the invention include—without wishing to make any restriction—functionalized α,β-unsaturated esters of the general structure (II)

where $R^1$=H or $CH_3$ and $R^3$=H or linear, branched or cyclic, saturated or unsaturated alkyl radicals having 1 to 30 carbon atoms, in particular having 4 to 18 carbon atoms, and containing at least one functional group which includes at least one atom which is different from carbon and from hydrogen.

Functionalized monomers which can be used with particular advantage for the purposes of this invention include, without making any claim to completeness, glycidyl methacrylate, glycidyl acrylate, allyl glycidyl ether, 2-hydroxyethyl methacrylate, 2-hydroxyethyl acrylate, 3-hydroxypropyl methacrylate, 3-hydroxy-propyl acrylate, 4-hydroxybutyl methacrylate, 4-hydroxybutyl acrylate, acrylic acid, methacrylic acid, itaconic acid, crotonic acid, methacrylamide, acrylamide, N-methylolmethacrylamide, N-methylolacrylamide, vinyl alcohol, 2-hydroxyethyl vinyl ether, 3-hydroxypropyl vinyl ether, 4-hydroxybutyl vinyl ether, maleic anhydride and itaconic anhydride.

Preparation of the Functionalized Polymers of the Invention

The functionalized polymers of the invention can be prepared using, for example, all controlled-growth, quasi-living or living free-radical polymerization processes. Mention may be made in this context by way of example, without making any claim to completeness, of ATRP (atom transfer radical polymerization), NMRP (nitroxide mediated radical polymerization) or of the RAFT process (reversible addition and fragmentation chain transfer), in other words, in particular, those processes which allow control over the molar masses and molar mass distribution of the polymer chain.

The preparation of the functionalized polymers of the invention via a controlled-growth, quasi-living or living free-radical polymerization process takes place in the presence of an organic solvent or in the presence of water or in mixtures of organic solvents and/or organic solvents with water, or without solvent. It is preferred to use as little solvent as possible. The polymerization time for processes which can be used in accordance with the invention amounts, depending on conversion and temperature, typically to between 4 and 72 h.

In the case of solution polymerization the solvents used are preferably esters of saturated carboxylic acids (such as ethyl acetate), aliphatic hydrocarbons (such as n-hexane, n-heptane or cyclohexane), ketones (such as acetone or methyl ethyl ketone), special-boiling-point spirit, aromatic solvents such as toluene or xylene or mixtures of aforementioned solvents. For polymerization in aqueous media or in mixtures of organic and aqueous solvents it is preferred to add emulsifiers and stabilizers to the polymerization.

Polymerization initiators used are, advantageously, customary radical-forming compounds such as peroxides, azo compounds and peroxosulfates, for example. Mixtures of initiators are also outstandingly suitable.

In an advantageous procedure, radical stabilization is carried out using nitroxides of type (III) or (IV):

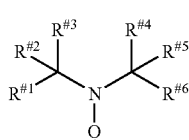

(III)

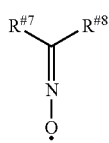

(IV)

where $R^{\#1}$, $R^{\#2}$, $R^{\#3}$, $R^{\#4}$, $R^{\#5}$, $R^{\#6}$, $R^{\#7}$ and $R^{\#8}$ independently of one another denote the following compounds or atoms:

i) halides, such as chlorine, bromine or iodine ii) linear, branched, cyclic and heterocyclic hydrocarbons having 1 to 20 carbon atoms, which can be saturated, unsaturated or aromatic, iii) esters —COOR$^{\#9}$, alkoxides —OR$^{\#10}$ and/or phosphonates —PO(OR$^{\#11}$)$_2$, where R$^{\#9}$, R$^{\#10}$ and/or R$^{\#11}$ stand for radicals from group ii).

Compounds of the structure (III) or (IV) can also be attached to polymer chains of any kind (primarily in the sense that at least one of the abovementioned radicals constitutes such a polymer chain) and may therefore be used as macroradicals or macroregulators.

Controlled regulators acquire greater preference for the polymerization of compounds of the following type:

2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxyl (TEMPO), 4-benzoyloxy-TEMPO, 4-methoxy-TEMPO, 4-chloro-TEMPO, 4-ydroxy-TEMPO, 4-oxo-TEMPO, 4-amino-TEMPO, 2,2,6,6-tetraethyl-1-piperidinyloxyl, 2,2,6-trimethyl-6-ethyl-1-piperidinyloxyl N-tert-butyl 1-phenyl-2-methylpropyl nitroxide N-tert-butyl 1-(2-naphthyl)-2-methylpropyl nitroxide N-tert-butyl 1-diethylphosphono-2,2-dimethylpropyl nitroxide N-tert-butyl 1-dibenzylphosphono-2,2-dimethylpropyl nitroxide N-(1-phenyl-2-methylpropyl) 1-diethylphosphono-1-methylethyl nitroxide di-t-butyl nitroxide diphenyl nitroxide t-butyl t-amyl nitroxide WO 98/13392 of Akzo Nobel N. V. describes open-chain alkoxyamine compounds which have a symmetrical substitution pattern. WO 96/24620 of Elf Atochem describes a polymerization process which uses very specific radical compounds such as phosphorus-containing nitroxides based on imidazolidine, for example. WO 98/44008 of B.F. Goodrich Co. discloses specific nitroxyls based on morpholines, piperazinones and piperazinediones. DE 199 49 352 of Ciba describes heterocyclic alkoxyamines as regulators in controlled-growth free-radical polymerizations. Corresponding developments of the alkoxyamines or of the corresponding free nitroxides enhance the efficiency for the preparation of polyacrylates (Hawker, Contribution to the National Meeting of the American Chemical Society, spring 1997; Husemann, Contribution to the IUPAC World Polymer Meeting 1998, Gold Coast). The regulator systems described in WO 98/13392, WO 96/24620, WO 98/44008 and DE 199 49 352, and developments of such systems, can be used for the purposes of this invention.

As a further polymerization method it is possible advantageously to use atom transfer radical polymerization (ATRP) to synthesize the functionalized polymers of the invention, in which case the initiator used comprises preferably monofunctional or difunctional secondary or tertiary halides and, for the purpose of abstracting the halide(s), complexes of Cu, Ni, Fe, Pd, Pt, Ru, Os, Rh, Co, Ir, Ag or Au (see, for example, texts EP 824 111; EP 826 698; EP 824 110, EP 841 346; EP 850 957 of Elf Atochem). The different possibilities of ATRP are further described in the texts U.S. Pat. Nos. 5,945,491 and 5,789,487 by K. Matyjaszewski et al. Processes of this kind can be used for the purposes of this invention.

As a very preferred preparation process for the functionalized polymers of the invention, a variant of the RAFT polymerization (reversible addition-fragmentation chain transfer) is carried out. The polymerization process is described in detail, for example, in the texts WO 98/01478 and WO 99/31144 of Du Pont de Nemours Co. To prepare the functionalized polymers suitability is possessed with particular advantage by trithiocarbonates of the general structure R'''—S—C(S)—S—R''' [R. T. A. Mayadunne, E. Rizzardo, J. Chiefari, J. Krstina, G. Moad, A. Postma, S. H. Thang, *Macromolecules*, 2000 33, 243]. In one very advantageous variant, for example, trithiocarbonate (V) or the thio compounds (VI) and (VII) are used for the polymerization, where Φ is a phenyl ring, which may be unfunctionalized or functionalized by alkyl or aryl substituents which are attached directly or via ester or ether bridges, or else may be a cyano group or may be a saturated or unsaturated aliphatic radical. The phenyl ring Φ may optionally carry one or more polymer chains, examples being polybutadiene, polyisoprene, polychloroprene, a (meth)acrylate copolymer or polystyrene, to name but a few. Functionalizations can be, for example, halogens, hydroxyl groups, epoxide groups, nitrogen-containing or sulfur-containing groups, without this list making any claim to completeness.

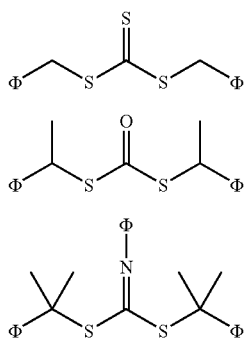

(V)

(VI)

(VII)

In addition it is possible to employ thioesters of the general structure

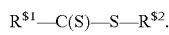

$R^{S1}$ and $R^{S2}$ may in this case be selected independently of one another, where $R^{S1}$ can be a radical from one of groups i) to iv) below and $R^{S2}$ may be a radical from one of groups i) to iii) below:

i) $C_1$ to $C_{18}$ alkyl, $C_2$ to $C_{18}$ alkenyl, $C_2$ to $C_{18}$ alkynyl, in each case linear or branched; aryl, phenyl-, benzyl-, aliphatic and aromatic heterocycles.

ii) —$NH_2$, —NH—$R^{S3}$, —$NR^{S3}R^{S4}$, —NH—C(O)—$R^{S3}$, —$NR^{S3}$—C(O)—$R^{S4}$, —NH—C(S)—$R^{S3}$, —$NR^{S3}$—C(S)—$R^{S4}$,

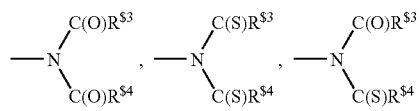

where $R^{S3}$ and $R^{S4}$ are radicals chosen independently of one another from group i).

iii) —S—$R^{S5}$ or —S—C(S)—$R^{S5}$, where $R^{S5}$ can be a radical from one of groups i) or ii).

iv) —O—$R^{S6}$ or —O—C(O)—$R^{S6}$, where $R^{S6}$ can be a radical chosen from one of groups i) or ii).

In conjunction with the abovementioned polymerizations which proceed by controlled-growth free-radical mechanisms it is preferred to use initiator systems which further comprise additional free-radical initiators for the polymerization, especially thermally decomposing radical-forming azo or peroxo initiators. In principle, however, all customary initiators known for (meth)acrylates are suitable for this purpose. The production of C-centered radicals is described by J. O. Metzger in Houben-Weyl, Methoden der Organischen Chemie, 4th ed., 1989, Vol. E19a, G. Thieme, Stuttgart. These methods are employed preferentially. Examples of radical sources are peroxides, hydroperoxides and azo compounds. A few non-exclusive examples of typical free-radical initiators that may be mentioned here include potassium peroxodisulfate, dibenzoyl peroxide, cumene hydroperoxide, cyclohexanone peroxide, cyclohexylsulfonyl acetyl peroxide, di-tert-butyl peroxide, azodiisobutyronitrile, diisopropyl percarbonate, tert-butyl peroctoate and benzpinacol. In one very preferred variant the free-radical initiator used is 1,1'-azobis(cyclohexylnitrile) (Vazo 88®, DuPont®) or 2,2-azobis(2-methylbutanenitrile) (Vazo 67®, DuPont®). It is also possible, moreover, to use radical sources which release free radicals only under UV irradiation.

In the case of the conventional RAFT process, polymerization is generally carried out only to low conversions [WO 98/01478], in order to produce very narrow molecular weight distributions. As a result of the low conversions, however, these polymers cannot be used as coating materials and in particular not as pressure-sensitive adhesives, since the high residual monomer fraction adversely affects the adhesive performance properties; the residual monomers contaminate the solvent recyclate in the concentration process; and the corresponding surface layers would exhibit very high outgassing.

The solvent is preferably stripped off in a concentrating extruder under reduced pressure, for which purpose it is possible, for example, to use single-screw or twin-screw extruders, which preferably distill off the solvent in different or the same vacuum stages and which possess a feed preheater.

Use of the Functionalized Polymers of the Invention

On account of their low melt viscosity, the functionalized polymers of the invention are particularly suitable as starting substances for surface coatings.

One preferred use of the functionalized polymers of the invention is their preferably solvent-free coating onto a surface. In order to offer good product properties as a surface layer, the functionalized polymers of the invention are crosslinked. The crosslinking reaction is advantageously initiated thermally and/or by means of actinic radiation and utilizes the specific chemistry of the functional groups present in the functionalized polymers. The crosslinking reaction may take place, in this case, between two functional groups directly or else in conjunction with a coupling additive that contains at least one functional group which is able to react with at least one of the functional groups present in the functionalized polymer of the invention. It is likewise possible to produce a chain extension with the aid of at least one coupling reagent. Because the functionalized polymers of the invention can carry more than two functional groups, chain extension and crosslinking will occur when reaction takes place with a difunctional coupling reagent. In order to allow the reaction leading to chain extension and/or crosslinking to take place in an advantageous way, an optional possibility is to add catalysts, activators or initiators.

In one particularly preferred utility the functionalized polymers of the invention serve as a base material, optionally also in combination with other base materials, for pressure-sensitive adhesives. In that case they are employed in self-adhesive products such as, in particular, single-sided or double-sided self-adhesive tapes.

It is likewise in accordance with the invention to use the functionalized polymers of the invention as a base material, optionally also in combination with other base materials, for surface coating materials.

The invention will be described in more detail below with the aid of an example.

Test Methods

Test 1—Gel Permeation Chromatography (GPC):

The weight average of the molar mass distribution, $M_w$, the polydispersity D, the molar mass difference $\Delta M$ and the parameters $M_{min}$ and $M_p$ required for this purpose were determined by means of gel permeation chromatography. The eluent used was THF containing 0.1% by volume of trifluoroacetic acid. Measurement took place at 23° C. The precolumn used was PSS-SDV, 10μ, $10^3$ Å, ID 8.0 mm×50 mm. Separation was carried out using the column combination PSS-SDV, 10μ, linear-one with ID 8.0 mm×300 mm. The sample concentration was 1 g/l and the flow rate was 0.5 ml per minute. Measurement was carried out against polystyrene standards.

Test 2—K Value:

The K value is a measure of the average molecule size of high polymer substances. The principle of the method is based on the determination of the relative solution viscosity by capillary viscometry. For this the test substance is dissolved in toluene by shaking for 30 minutes to give a 1% strength solution. The flow time is measured at 25° C. in a Vogel-Ossag viscometer and from the result, in relation to the viscosity of the solvent alone, the relative viscosity of the sample solution is determined. From tables it is possible in accordance with Fikentscher [P. E. Hinkamp, *Polymer*, 1967, 8, 381] to read off the K value (K=1000 k).

Test 3—Gel Index:

The solvent-free pressure-sensitive adhesive samples are welded into a nonwoven pouch made of polyethylene (Tyvek nonwoven). Soluble constituents are extracted with toluene over a period of three days, with the solvent changed daily. The difference in the sample weights before and after extraction is used to determine the gel index, as the percentage of the weight fraction of the polymer that is not extractable with toluene.

Test 4—Bond Strength:

The peel strength (bond strength) was tested in accordance with PSTC-1. A pressure-sensitive adhesive layer 50 μm thick is applied to a PET film 25 μm thick. A strip of this specimen 2 cm wide is bonded to a sanded steel plate by being rolled over back and forth five times using a 5 kg roller. The plate is clamped in and the self-adhesive strip is pulled via its free end in a tensile testing machine at a speed of 300 mm/min under a peel angle of 180°.

Test 5—Shear Resistance Times:

The test was carried out by a method based on PSTC-7. A pressure-sensitive adhesive layer 50 μm thick is applied to a PET film 25 μm thick. A strip of this specimen 1.3 cm wide is bonded to a polished steel plaque over a length of 2 cm by rolling over the bond back and forth twice using a 2 kg roller. The plaques are equilibrated for 30 minutes under test conditions (temperature and atmospheric humidity) but without any load. The test weight is then hung on, producing a shearing stress parallel to the bond area, and the measurement is made of the time taken for the bond to fail. If a holding time of 10 000 minutes is reached, then the experiment is discontinued before the adhesive bond fails.

EXAMPLES

Example A

A 2 l steel reactor conventional for free-radical polymerization was charged under a nitrogen atmosphere with 285 g of 2-ethylhexyl acrylate, 285 g of n-butyl acrylate, 30 g of 2-hydroxyethyl methacrylate, 400 g of acetone and 15.3 g of dibenzyl trithiocarbonate (prepared in accordance with instructions by W. M. Albert, *Synth. Commun.*, 1988, 18, 1531 using benzyl bromide and carbon disulfide). The reactor was heated to an internal temperature of 58° C. and the monomer mixture was initiated with 0.1 g of Vazo 67® (DuPont). After 4 hours 40 minutes, initiation was repeated with 0.1 g of Vazo 67®. The temperature at this point was 67° C. After 24.5 hours the reactor was cooled and the polymer solution run off. The product was freed from solvent in a vacuum drying cabinet. GPC (test 1) indicated $M_n$=14 700 g/mol with a polydispersity of 1.23. The K value (test 2) was 17.6.

Comparative Example B

A 2 l steel reactor conventional for free-radical polymerization was charged under a nitrogen atmosphere with 285 g of 2-ethylhexyl acrylate, 285 g of n-butyl acrylate, 30 g of 2-hydroxyethyl methacrylate and 400 g of isopropanol. The reactor was heated to an internal temperature of 58° C. and the monomer mixture was initiated with 0.1 g of Vazo 67® (DuPont). After one hour, initiation was repeated with 0.1 g of Vazo 67®. The temperature at this point was 89° C. After 25 hours the reactor was cooled and the polymer solution run off. The product was freed from solvent in a vacuum drying cabinet. GPC (test 1) indicated $M_n$=11 400 g/mol with a polydispersity of 3.05. The K value (test 2) was 23.8.

The nature of the example compounds was chosen so that in the crosslinked state the compounds can be used potentially as pressure-sensitive adhesives. The products obtained according to Examples A and B were mixed for crosslinking with isophorone diisocyanate (Vestanat IPDI®, Hüls) using Coscat 83® (C. H. Erbslöh) as catalyst at room temperature without solvent and immediately thereafter were coated with a layer thickness of 50 μm onto polyester film 25 μm thick (Example A: 50 g of polymer A+2.28 g of Vestanat IPDI®+ 0.16 g of Coscat 83®; Example B: 50 g of polymer B+2.88 g of Vestanat IPDI®+0.16 g of Coscat 83®. The network structure was assessed via a gel index analysis (test 3; see Table 2). The coated specimens were cut into test strips and the self-adhesive tapes thus obtained were investigated in respect of their adhesive performance properties (tests 4 and 5; see Table 2).

Table 2 shows clearly the difference in adhesive performance profile between Example A and Example B. Functionalized polymers of the invention can be converted into pressure-sensitive adhesive materials with very good cohesion, while conventionally prepared systems are unsuitable for use in self-adhesive tapes. These differences in properties can be explained by an alteration in composition, comprising crosslinked and uncrosslinked constituents, in the pressure-sensitive adhesive. These differences will be dealt with briefly below, in order to make clear the advantages of the functionalized polymers of the invention when used as crosslinked material in surface layers.

TABLE 2

|  | Example A | Comparative Example B |
|---|---|---|
| Test 1: GPC | $M_n$ = 14 700 g/mol | $M_n$ = 11 700 g/mol |
|  | $M_w$ = 18 000 g/mol | $M_w$ = 34 900 g/mol |
|  | $M_{min}$ = 7 200 g/mol | $M_{min}$ = 2 900 g/mol |
|  | $M_p$ = 19 000 g/mol | $M_p$ = 34 400 g/mol |
|  | D = 1.23 | D = 3.05 |
|  | ΔM = 11 800 g/mol | ΔM = 31 100 g/mol |
| Test 2: K value of the uncrosslinked material | 17.6 | 23.8 |
| Test 3: Gel index | 82.0% | 65.2% |
| Test 4: Bond strength | 0.4 N/cm | <0.1 N/cm (greasy film remains on substrate) |
| Test 5: Shear resistance time |  |  |
| 1 kg, 23° C. | >10 000 min | 17 min (af w. gf) |
| 1 kg, 40° C. | >10 000 min |  |
| 1 kg, 70° C. | >10 000 min |  |

(af w. gf: adhesive fracture with greasy film on substrate)

For a more precise analysis of the state of the crosslinked materials from Example A and Example B, further experiments were conducted. In these experiments, again, the ratios of the functionalized polymers, of the diisocyanate and of the catalyst for the crosslinking reaction were chosen as indicated above. The gel indices for the experiments described here differ slightly from those found for the experiments described above (Table 2), although this does not affect the meaningfulness of the fundamental interpretations of the following section.

The comparison product obtained according to Example B has a K value (test 2) in the uncrosslinked state (gel index=0%, test 3) of 23.8 units. NMR analysis of this prepolymer indicated a polymer composition corresponding to the incorporation of 47.2% by weight n-butyl acrylate, 48.1% by weight 2-ethylhexyl acrylate and 4.7% by weight 2-hydroxyethyl methacrylate. The reaction of this system with isophorone diisocyanate results in polymer crosslinking. The polymer network thereafter has a gel index, in other words a mass fraction of insoluble constituents, of 73.6%. The remaining 26.4% of the sample cannot be tied into the polymer network, and represent the soluble fraction. NMR analysis of these soluble fractions indicated that a composition which corresponds to the incorporation of 50.2% by weight n-butyl acrylate and 49.8% by weight 2-ethylhexyl acrylate. No evidence of incorporation of 2-hydroxyethyl methacrylate into these soluble constituents was found. For a further analysis of these soluble constituents, the K value (test 2) was determined again. At 13.5 units, this was significantly below the index of the unreacted prepolymer. In view of the K value difference of 10.3 units and the results of NMR analysis it can be stated that the non-crosslinkable polymer component comprises low molecular mass constituents possessing inadequate OH functionalization. The relatively high fraction of uncrosslinkable polymer chains of low molecular mass leads to a material system with inadequate cohesion, in which the polymers with a low degree of polymerization act as unwanted plasticizers, migrate to the surface after bonding, and leave a greasy film on redetachment.

A polymer functionalized in accordance with the invention and obtained according to Example A has a gel index of 0% (test 3) and a K value (test 2) of 17.6 units in the uncrosslinked state. NMR analysis of this prepolymer indicated a composition corresponding to the incorporation of 43.7% by weight n-butyl acrylate, 50.5% by weight 2-ethylhexyl acrylate and 5.8% by weight 2-hydroxyethyl methacrylate. Reacting this system with isophorone diisocyanate leads to crosslinking of the functionalized polymer. The polymer network thereafter has a gel index of 82.0% (test 3). Only 18.0% of the material system cannot be tied into the polymer network, representing a significantly reduced fraction as compared with the comparative example. Here again, NMR analysis of the soluble constituents showed no signs of the incorporation of 2-hydroxyethyl methacrylate. The K value (test 2) of the soluble constituents, at 15.5 units, was only slightly below the index of the unreacted prepolymer. In view of the low K value difference and the results of NMR analysis it may be stated that the non-crosslinkable polymer constituents are insufficiently OH-functionalized constituents which lie only slightly below the average molecular weight of the prepolymer. These constituents, which are not incorporated into the polymer network, do not result in any decisive influence on the cohesion of the material system, meaning that the crosslinked polymers functionalized in accordance with the invention can be used with advantage as, for example, pressure-sensitive adhesives.

The invention claimed is:

1. A pressure-sensitive adhesive comprising at least one functionalized polymer comprised of more than 50% by weight (meth)acrylate monomers, wherein the weight average of the molar mass distribution is situated between 5000 g/mol and 200 000 g/mol and the difference between $M_p$ and $M_{min}$ is less than 25 000 g/mol, where
   (a) $M_p$ is the peak molar mass of a monomodal polymer or the peak molar mass of the smallest mode in a bimodal or multimodal polymer,
   (b) $M_{min}$ is the smallest molar mass occurring in the molar mass distribution, defined on the basis of the point at which the cumulative frequency of the molar mass distribution has a value of 0.05,
   (c) the functionalized polymer is linear, branched or star-shaped in structure,
   (d) the functionalized polymer carries at least one kind of fictionalizations, which can be utilized for subsequent crosslinking of the functionalized polymer,
   (e) at least 50% of the polymer chains of the functionalized polymer carry at least two functionalizations,
   (f) at least 75% of the polymer chains of the functionalized polymer carry at least one functionalization; and
   (g) the at least one kind of functionalization of the functionalized polymer results from the use of at least one variety of a functionalized monomer in the preparation of the functionalized polymer.

2. A pressure-sensitive adhesive comprising at least one functionalized block copolymer comprised of more than 50% by weight (meth)acrylate monomers, wherein the weight average of the molar mass distribution is situated between 5000 g/mol and 200 000 g/mol and the difference between $M_p$ and $M_{min}$ is less than 25 000 g/mol, where
   (a) $M_p$ is the peak molar mass of a monomodal block copolymer or the peak molar mass of the smallest mode in a bimodal or multimodal block copolymer,
   (b) $M_{min}$ is the smallest molar mass occurring in the molar mass distribution, defined on the basis of the point at which the cumulative frequency of the molar mass distribution has a value of 0.05,
   (c) the functionalized block copolymer is linear, branched, star-shaped or grafted in structure,
   (d) at least one block of the functionalized block copolymer carries at least one kind of functionalization, which can be utilized for subsequent crosslinking of the functionalized block copolymer, (e) at least 50% of at least one block of the block copolymer chains of the functionalized block copolymer carry at least two functionalizations, (f) at least 75% of at least one block of the block copolymer chains of the functionalized block copolymer carry at least one functionalization, (g) its at least one kind of functionalization of the functionalized block copolymer results from the use of at least one variety of a functionalized monomer in the preparation of the functionalized block copolymer.

3. The pressure-sensitive adhesive as claimed in claim 1, wherein the functionalized polymer is obtained by polymerization of a monomer mixture and the monomer mixture from which the functionalized polymer is obtained by polymerization contains up to 20% of at least one kind of a functionalized monomer.

4. The pressure-sensitive adhesive as claimed in claim 1, wherein the functionalized polymer is obtained by polymerization of a monomer mixture of at least one variety of functionalized monomers and one variety of unfunctionalized monomers, and the unfunctionalized monomers for preparing the functionalized polymers are taken from one or a combination of unfunctionalized α,β-unsaturated esters of the general structure $$CH_2=CH(R^1)(COOR^2)$$

where $R^1=H$ or $CH_3$ and $R^2$ =linear, branched or cyclic, saturated or unsaturated alkyl radicals having 1 to 30 carbon atoms.

5. The pressure-sensitive adhesive as claimed in claim 1, wherein the functionalized monomers for preparing the functionalized polymers are taken from one or a combination of unfunctionalized α,β-unsaturated esters of the general structure $$CH_2=CH(R^1)(COOR^3)$$

where $R^1=H$ or $CH_3$ and $R^3=H$ or linear, branched or cyclic, saturated or unsaturated alkyl radicals having 1 to 30 carbon atoms and containing at least one functional group which includes at least one atom that is different from carbon and from hydrogen.

6. The pressure-sensitive adhesive as claimed in claim 5, wherein the functionalized polymers are prepared from a monomer mixture of at least one variety of functionalized monomers and at least one variety of unfunctionalized monomers, and the functionalized monomers are taken from one or a combination of functionalized α,β-unsaturated carbonyl compounds selected from the group consisting of acrylic acid, methacrylic acid, 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyl methacrylate, itaconic acid, crotonic acid, acrylamide, methacrylamide, N-methylolacrylamide, N-methylolmethacrylamide, glycidyl acrylate, glycidyl methacrylate, vinyl alcohol, 2-hydroxyethyl vinyl ether, 3-hydroxypropyl vinyl ether, 4-hydroxybutyl vinyl ether, maleic anhydride and itaconic anhydride.

7. A process for preparing a pressure-sensitive adhesive as claimed in claim 1, comprising (a) preparing a functionalized polymer of claim 1 by a controlled-growth, quasi-living or living, free-radical polymerization process; and (b) crosslinking the functionalized polymer.

8. The process as claimed in claim 7, wherein the functionalized polymer is brought to chain extension and/or crosslinking by addition of a coupling reagent and, optionally, catalysts, initiators or activators.

9. The process as claimed in claim 8, wherein the chain extension and/or crosslinking is initiated by the influence of thermal energy and/or actinic radiation.

10. The process as claimed in claim 8, wherein chain extension reaction and/or crosslinking reaction takes place during and/or after coating.

11. A self-adhesive product, comprising at least one pressure-sensitive adhesive of claim 1.

12. A self-adhesive product comprising at least one pressure-sensitive adhesive produced by the process of claim 7.

13. The pressure-sensitive adhesive of claim 1, wherein said weight average of the molar mass distribution is between 10,000 g/mol and 100,000 g/mol.

14. The pressure-sensitive adhesive of claim 1, wherein said difference between $M_p$ and $M_{min}$ is less than 15,000 g/mol.

15. The pressure-sensitive adhesive of claim 2, wherein said weight average of the molar mass distribution is between 10,000 g/mol and 100,000 g/mol.

16. The pressure-sensitive adhesive as claimed in claim 2, wherein the functionalized block polymer is prepared to an extent of more than 50% from (meth)acrylate monomers.

17. The pressure-sensitive adhesive as claimed in claim 2, wherein the functionalized block polymer is obtained by polymerization of a monomer mixture and the monomer mixture from which the functionalized block polymer is obtained by polymerization contains up to 20% of at least one kind of a functionalized monomer.

18. The pressure-sensitive adhesive as claimed in claim 2, wherein the functionalized block polymer is obtained by polymerization of a monomer mixture of at least one variety of functionalized monomers and one variety of unfunctionalized monomers, and the unfunctionalized monomers for preparing the functionalized block polymer are taken from one or a combination of unfunctionalized α,β-unsaturated esters of the general structure $$CH_2=CH(R^1)(COOR^2)$$

where $R^1=H$ or $CH_3$ and $R^2$=linear, branched or cyclic, saturated or unsaturated alkyl radicals having 1 to 30 carbon atoms.

19. The pressure-sensitive adhesive as claimed in claim 2, wherein the functionalized monomers for preparing the functionalized block polymers are taken from one or a combination of unfunctionalized α,β-unsaturated esters of the general structure $$CH_2=CH(R^1)(COOR^3)$$

where $R^1=H$ or $CH_3$ and $R^3=H$ or linear, branched or cyclic, saturated or unsaturated alkyl radicals having 1 to 30 carbon atoms and containing at least one functional group which includes at least one atom that is different from carbon and from hydrogen.

20. The pressure-sensitive adhesive as claimed in claim 19, wherein the functionalized polymers are prepared from a monomer mixture of at least one variety of functionalized monomers and at least one variety of unfunctionalized monomers, and the functionalized monomers are taken from one or a combination of functionalized α,β-unsaturated carbonyl compounds selected from the group consisting of acrylic acid, methacrylic acid, 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyl methacrylate, itaconic acid, crotonic acid, acrylamide, methacrylamide, N-methylolacrylamide, N-methylolmethacrylamide, glycidyl acrylate, glycidyl methacrylate, vinyl alcohol, 2-hydroxyethyl vinyl ether, 3-hydroxypropyl vinyl ether, 4-hydroxybutyl vinyl ether, maleic anhydride and itaconic anhydride.

21. A process for preparing a pressure-sensitive adhesive as claimed in claim 2, comprising
   (a) preparing a functionalized block polymer claim 2 by a controlled-growth, quasi-living or living, free-radical polymerization process; and
   (b) crosslinking the functionalized polymer.

22. The process as claimed in claim 21, wherein the functionalized polymer is brought to chain extension and/or crosslinking by addition of a coupling reagent and, optionally, catalysts, initiators or activators.

23. The process as claimed in claim 22, wherein the chain extension and/or crosslinking is initiated by the influence of thermal energy and/or actinic radiation.

24. The process as claimed in claim 22, wherein chain extension reaction and/or crosslinking reaction takes place during and/or after coating.

25. A self-adhesive product, comprising at least one pressure-sensitive adhesive of claim 2.

26. A self-adhesive product comprising at least one pressure-sensitive adhesive produced by the process of claim 21.

27. The pressure-sensitive adhesive of claim 2, wherein said weight average of the molar mass distribution is between 10,000 g/mol and 100,000 g/mol.

28. The pressure-sensitive adhesive of claim 2, wherein said difference between $M_p$ and $M_{min}$ is less than 15,000 g/mol.

29. The pressure-sensitive adhesive of claim 2, wherein said weight average of the molar mass distribution is between 10,000 g/mol and 100,000 g/mol.

* * * * *